Figure 1:
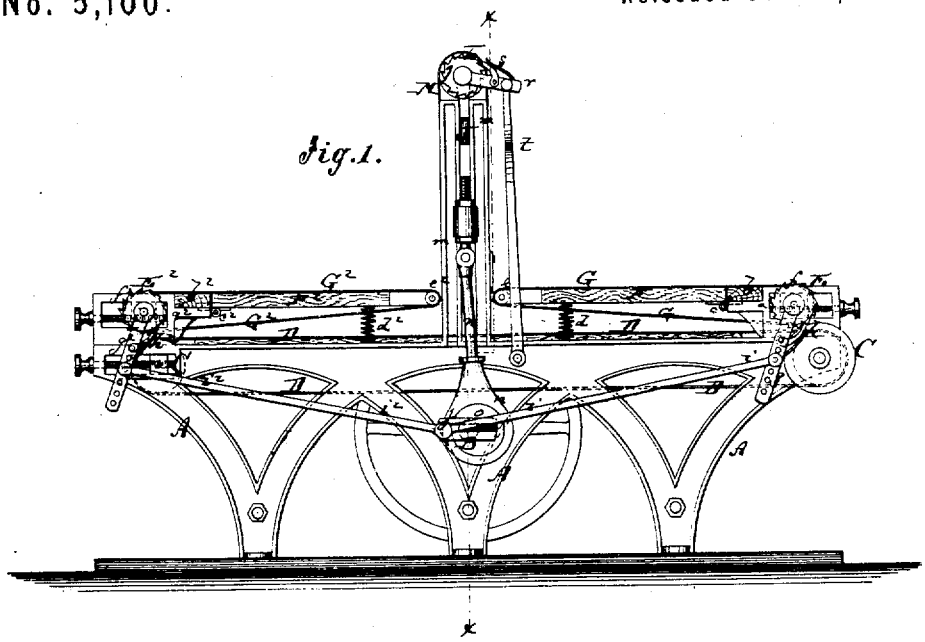
Figure 2:
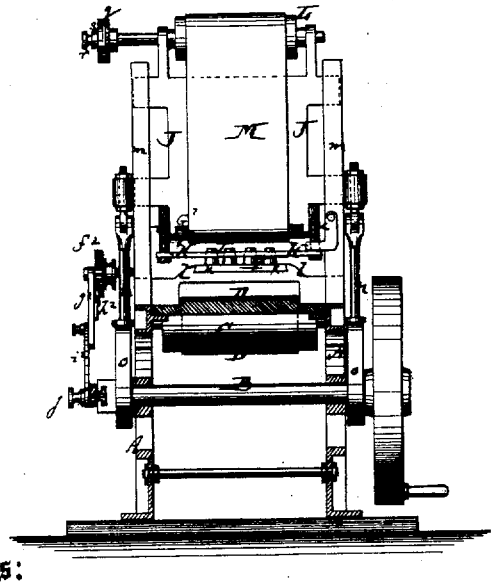
Figure 3:
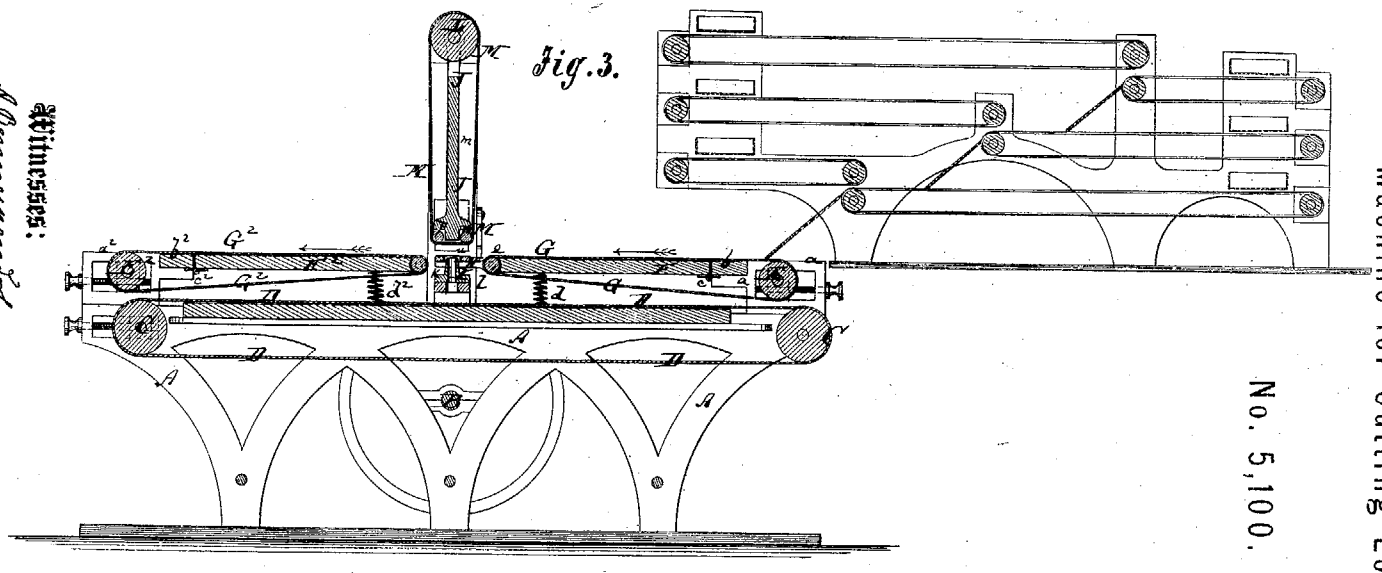
Figure 1:
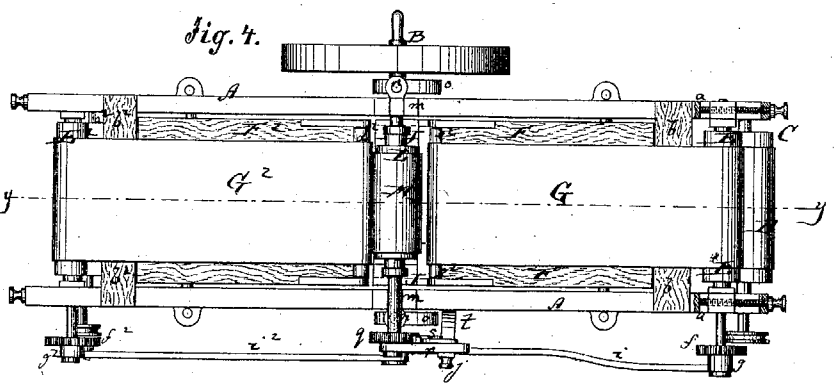

425-101

BEST AVAILABLE COPY

2 Sheets--Sheet 1.

W. E. DAMANT.

Machine for Cutting Lozenges, &c.

No. 5,100. Reissued Oct. 15, 1872.

Witnesses:
A. Bennenendorf.
Wm H. C. Smith.

Inventor:
W. E. Damant.
Per Munn & Co
Attorneys.

AM. PHOTO-LITHOGRAPHIC CO. N.Y. (OSBORNE'S PROCESS.)

BEST AVAILABLE COPY

W. E. DAMANT.
Machine for Cutting Lozenges, &c

No. 5,100. Reissued Oct. 15, 1872.

Witnesses:
A Bennenendorf.
Wm H. C. Smith.

Inventor:
W. E. Damant.
Per Munn & Co
Attorneys.

AM. PHOTO-LITHOGRAPHIC CO. N.Y. (OSBORNE'S PROCESS.)

UNITED STATES PATENT OFFICE.

WILLIAM E. DAMANT, OF WEST HOBOKEN, NEW JERSEY, ASSIGNOR TO HIMSELF AND WILLIAM HESSIN.

IMPROVEMENT IN APPARATUS FOR PREPARING THE PASTE FOR LOZENGE-CUTTING MACHINES.

Specification forming part of Letters Patent No. 113,635, dated April 11, 1871; reissue No. 5,100, dated October 15, 1872.

DIVISION B.

*To all whom it may concern:*

Be it known that WILLIAM EDWARD DAMANT, of West. Hoboken, in the county of Hudson and State of New Jersey, has invented a new and Improved Machine for Rolling Dough and Paste, of which the following is a specification:

The drawing represents a vertical longitudinal section of the improved machine for rolling dough, paste, &c.

This invention relates to a new machine for flattening out the dough and paste used in the manufacture of confectionery, biscuits, &c., while feeding the same to the apparatus on which such dough or paste is subsequently cut or shaped. The invention consists in the combination, with each other, of two or more pairs of endless aprons, between which the dough is gradually compressed or flattened out to the requisite thinness. The invention also consists in the combination of starch-boxes having perforated bottoms with the above-mentioned aprons, the boxes being secured above the aprons to deposit thin layers of starch or equivalent substance thereon for preventing the adhesion of the dough thereto.

S $S^1$ $S^2$ $S^3$ $S^4$ $S^5$ in the drawing are three pairs of endless aprons, arranged parallel to each other, but at different altitudes, on rollers T, whose bearings are in a stationary frame, U. One end of the apron S is a short distance above one end of the apron $S^1$, as shown, one end of $S^2$ above that of $S^3$, and one end of $S^4$ above one end of $S^5$, the overlying ends of each pair of aprons being the inner ends or in the inner part of the frame U, as shown. The space between the aprons S $S^1$ is larger than that between $S^2$ $S^3$, and the latter again larger than the space between $S^4$ $S^5$. An inclined stationary board or platform, V, extends from the inner end of the apron $S^1$ to the apron $S^3$, one from the inner end of $S^3$ to $S^5$, and one from the end of $S^5$ to a belt or feeding apparatus, G, by which the compressed or flattened dough is finally delivered to the cutting or shaping mechanism. These inclines V may, however, be dispensed with if the aprons are placed so close together that one may discharge directly on the other. Above every one of the aprons is placed a box, W, which has a perforated or bolting-cloth bottom.

Starch or equivalent substance is put into the boxes W, and thence gradually deposited upon the aprons to prevent the adhesion to the latter of the paste or dough. The paste or dough is fed to the apron $S^1$, and by the same conveyed under the apron S. Between rolls T T the paste or dough is compressed into a thinner sheet than that in which it was fed to apron $S^1$. From the apron $S^1$ the paste thus compressed is deposited upon incline V and then on apron $S^3$. It is then still more compressed between rolls $T^1$ $T^1$ and deposited upon apron $S^5$. It is finally still more flattened between rolls $T^2$ $T^2$ and discharged upon the receiver G. The paste is thus automatically and gradually flattened out into condition for being cut or shaped.

For many cases two pairs of aprons may answer instead of three.

We claim as the invention of WILLIAM EDWARD DAMANT—

1. The combination, with each other, of two or more pairs of aprons, arranged one set above another, and with gradually-diminishing spaces between every succeeding pair of rolls, substantially as and for the purpose herein shown and described.

2. The combination, with subject-matter of first claim, of the starch-boxes W W, arranged substantially as herein shown and described.

WILLIAM EDWARD DAMANT.
WILLIAM HESSIN.

Witnesses for DAMANT:
A. V. BRIESEN,
T. B. MOSHER.

Witnesses for HESSIN:
R. JAMES,
W. H. JEFFREY.